(12) United States Patent
Sakai

(10) Patent No.: US 8,595,858 B2
(45) Date of Patent: Nov. 26, 2013

(54) DEVICE AND TAMPER DETECTION SYSTEM

(75) Inventor: Hiroki Sakai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1512 days.

(21) Appl. No.: 11/939,063

(22) Filed: Nov. 13, 2007

(65) Prior Publication Data

US 2010/0283604 A1    Nov. 11, 2010

(30) Foreign Application Priority Data

Nov. 14, 2006    (JP) .................................. 2006-307617

(51) Int. Cl.
*H04L 29/06* (2006.01)
(52) U.S. Cl.
USPC .......................................................... 726/34
(58) Field of Classification Search
USPC ........................................... 713/200; 726/23
See application file for complete search history.

(56) References Cited

U.S. PATENT DOCUMENTS

| | | | |
|---|---|---|---|
| 7,565,692 B1 * | 7/2009 | Maria | 726/23 |
| 2001/0047483 A1 * | 11/2001 | Kuo et al. | 713/200 |

FOREIGN PATENT DOCUMENTS

| | | |
|---|---|---|
| JP | 2002-7263 A | 1/2002 |
| JP | 2002-24093 A | 1/2002 |
| JP | 2005-227852 A | 8/2005 |

* cited by examiner

*Primary Examiner* — William Goodchild
(74) *Attorney, Agent, or Firm* — Crowell & Moring LLP

(57) ABSTRACT

Disclosed is a device including: a control section; a tamper detection section to detect changes of predetermined states of a plurality of pre-defined parts of the device, and to output detection information; a storage section to store the detection information, and request information for requesting the tamper detection section to detect a change of a predetermined state of a specific part of the plurality of parts, wherein when a main power supply section of the device is in an off-state, the electric power is supplied to the control section, the tamper detection section and the storage section from a standby power supply section, and the control section controls the tamper detection section and the storage section so that the tamper detection section detects the change of the predetermined state of the specific part in accordance with the request information, and the storage section stores the detection information.

3 Claims, 6 Drawing Sheets

DEVICE AND TAMPER DETECTION SYSTEM

BACKGROUND OF THE INVENTION

1. Field of the Invention

The present invention relates to a device and a tamper detection system.

2. Description of Related Art

In recent years, there has been a problem that an internal structure of hardware or software constituting a device, data stored in the device, and the like are illegally analyzed or manipulated (hereinafter referred to as a "tamper action").

In order to solve such a problem, various techniques have been proposed.

To put it concretely, for example, in order to prevent software that is executed in an information processing terminal from being forged, manipulated or used for illicit purposes, an information processing terminal which downloads software through a network when electric power is on and which deletes the downloaded software when the power is off was proposed (see, for example, Japanese Patent Application Laid-Open Publication No. 2005-227852).

Moreover, for example, in order to have someone not recognize that security is built to improve security against stealing or manipulating data, a security apparatus capable of reading and rewriting data stored in a dummy hard disk drive (HDD) device when the power is on by a power switch, and capable of reading and rewriting data stored in a master HDD device when the power is on by inputting a password was proposed (see, for example, Japanese Patent Application Laid-Open Publication No. 2002-24093).

Furthermore, in order to safely and secretly manage input and output information of digital content transmitted between devices, a system in which an apparatus having a tamper resistant storage region is connected to one of the devices between which the digital content is transmitted, and in which the input and output information of the digital content between the devices is written in the tamper resistant storage region was proposed (see, for example, Japanese Patent Application Laid-Open Publication No. 2002-7263).

However, the technique disclosed in the Japanese Patent Application Laid-Open Publication No. 2005-227852 can cope with a tamper action against downloadable software, but there is a problem that the technique cannot cope with a wide range of tamper actions including a tamper action against hardware.

The technique disclosed in the Japanese Patent Application Laid-Open Publication No. 2002-24093 can cope with a tamper action against the data stored in the master HDD device, but there are problems that the technique cannot cope with a wide range of tamper actions including a tamper action against hardware and that the technique cannot cope with a tamper action executed when the power of the security apparatus is off even if the tamper action is executed with the data stored in the master HDD device.

The technique disclosed in the Japanese Patent Application Laid-Open Publication No. 2002-7263 can cope with a tamper action against the data stored in the tamper resistant storage region, but there are problems that the technique cannot cope with a wide range of tamper actions including a tamper action against hardware and that the technique cannot detect a tamper action executed when the power is off.

SUMMARY OF THE INVENTION

It is, therefore, a main object of the present invention to provide a device capable of coping with detection of a wide range of tamper actions executed when electric power is off and capable of detecting the tamper actions in a relatively simple structure, and a tamper detection system including the device.

According to a first aspect of the present invention, there is provided a tamper detection system, comprising a server, and a device connected to the server through a communication network, wherein the device comprises:

a tamper detection section to detect changes of predetermined states of a plurality of pre-defined parts of the device in order to detect a tamper action against the device, and to output detection information;

a nonvolatile detection information storage section to store the detection information outputted by the tamper detection section;

a nonvolatile request information storage section to store request information for requesting the tamper detection section to detect a change of a predetermined state of a specific part of the plurality of parts;

a power supply unit including a main power supply section to supply electric power to the device, and a standby power supply section to supply electric power to the tamper detection section, the detection information storage section, and the request information storage section when the main power supply section is in an off-state;

a detection information transmission section to transmit the detection information stored in the detection information storage section to the server when the main power supply section is turned into an on-state;

a request information receiving section to receive the request information transmitted by the server; and a control section, and the server comprises:

a detection information receiving section to receive the detection information transmitted by the device; and a request information transmission section to transmit the request information to the device, and when the main power supply section is in an off-state, the electric power is supplied to the tamper detection section, the detection information storage section, the request information storage section, and the control section from the standby power supply section, and the control section controls the tamper detection section, the detection information storage section, and the request information storage section so that the tamper detection section detects the change of the predetermined state of the specific part in accordance with the request information stored in the request information storage section, and the detection information storage section stores the detection information outputted by the tamper detection section.

According to a second aspect of the present invention, there is provided a device connected to a server through a communication network, the device comprising:

a tamper detection section to detect changes of predetermined states of a plurality of pre-defined parts of the device in order to detect a tamper action against the device, and to output detection information;

a nonvolatile detection information storage section to store the detection information outputted by the tamper detection section;

a nonvolatile request information storage section to store request information for requesting the tamper detection section to detect a change of a predetermined state of a specific part of the plurality of parts;

a power supply unit including a main power supply section to supply electric power to the device, and a standby power supply section to supply electric power to the tamper detection section, the detection information storage section, and the request information storage section when the main power supply section is in an off-state;

a detection information transmission section to transmit the detection information stored in the detection information storage section to the server at predetermined timing; and a control section, wherein when the main power supply section is in an off-state, the electric power is supplied to the tamper detection section, the detection information storage section, the request information storage section, and the control section from the standby power supply section, and the control section controls the tamper detection section, the detection information storage section, and the request information storage section so that the tamper detection section detects the change of the predetermined state of the specific part in accordance with the request information stored in the request information storage section, and the detection information storage section stores the detection information outputted by the tamper detection section.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, best mode for a device and a tamper detection system having the device according to the present invention will be described in detail with reference to the attached drawings. The scope of the present invention is not limited to the shown examples.

In the embodiment, an electronic device will be illustrated as an application of the device.

<Configuration>

First of all, the configurations of an electronic device 2 and a tamper detection system 1 having the electronic device 2 will be described with reference to FIGS. 1-3.

[Tamper Detection System]

Figure 1:
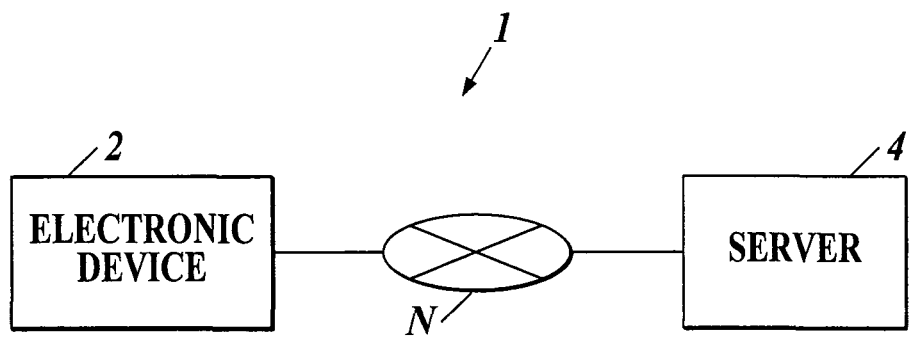
FIG. 1 is a diagram showing a configuration of a tamper detection system according to a preferred embodiment of the present invention.

The tamper detection system 1, for example, includes a server 4 and the electronic device 2 connected to the server 4 through a communication network N as shown in FIG. 1.

The communication network N is a communication network such as the Internet, a local area network (LAN), and a wide area network (WAN), and includes various communication lines such as a telephone network, an Integrated Services Digital Network (ISDN) line, a broad communication network, a leased line network, a mobile communication network, a communication satellite circuit, a community antenna television (CATV) network, an optical communication line, and a wireless communication line, and includes internet service providers connecting those various communication lines.

[Electronic Device]

Figure 2:
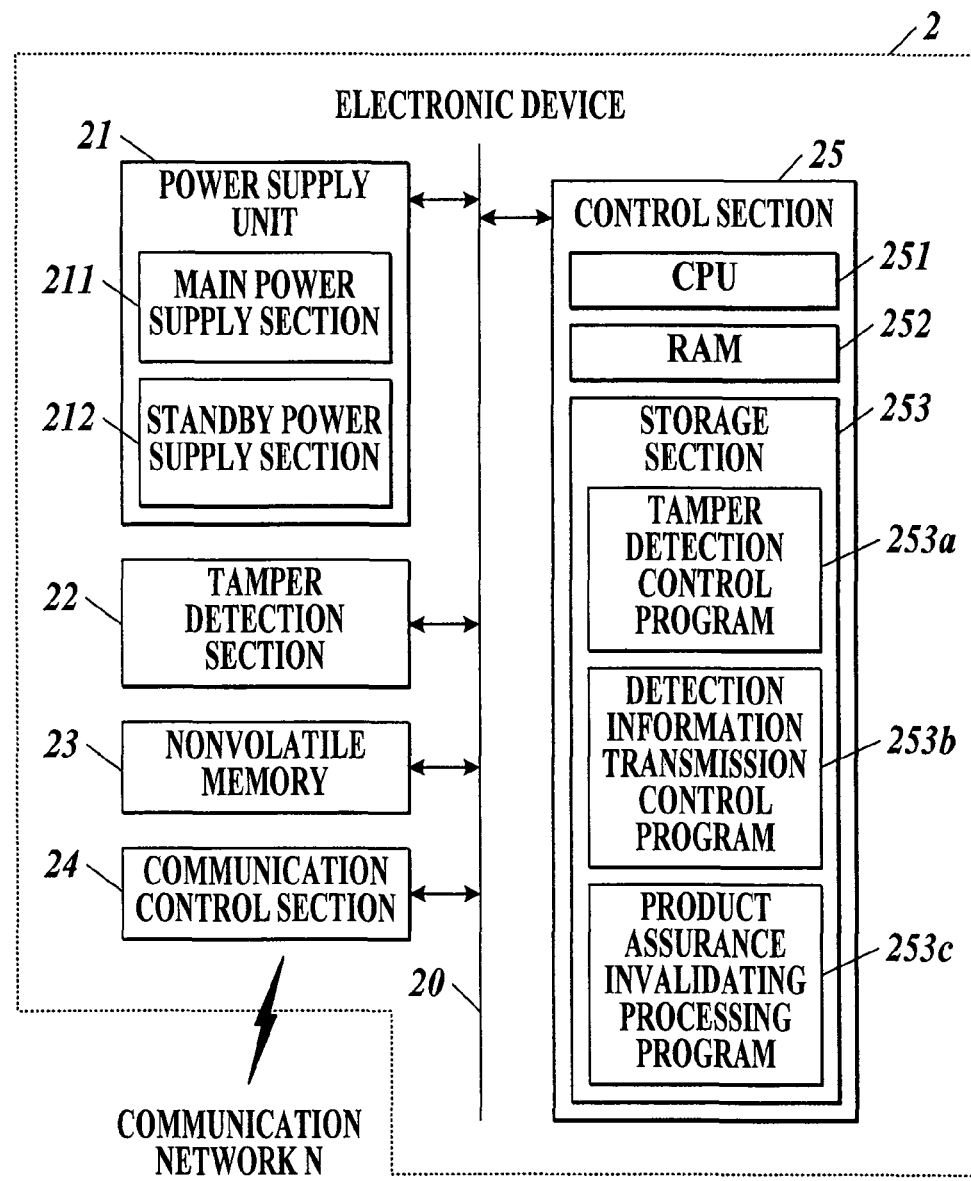
FIG. 2 is a block diagram showing a functional configuration of an electronic device (or a device) according to a preferred embodiment of the present invention.

The electronic device 2, for example, as shown in FIG. 2, includes a power supply unit 21, a tamper detection section 22, a nonvolatile memory 23, a communication control section 24, a control section 25, and the like. Each section is connected to one another through a bus 20.

The electronic device 2 is concretely, for example, a network home electric appliance (for example, a digital versatile disc (DVD) recorder, a digital television apparatus, or a personal computer) having functions of remote control and download of content through the communication network N. Since the network home electric appliance has a general structure, a detail description of the structure will be omitted.

The power supply unit 21 is, for example, for supplying electric power to each section constituting the electronic device 2. The power supply unit 21 includes, for example, as shown in FIG. 2, a main power supply section 211, a standby power supply section 212, and the like.

The main power supply section 211, for example, supplies the electric power supplied through a power cord (not shown) to each section constituting the electronic device 2.

The standby power supply section 212 has, for example, a built-in battery (not shown), and supplies electric power to the tamper detection section 22, the nonvolatile memory 23, the control section 25, and the like constituting the electronic device 2 when the main power supply section 211 is in an off-state.

In order to detect a tamper action against the electronic device 2, the tamper detection section 22 includes a switch, a sensor, and the like which detect changes of predetermined states of a plurality of pre-defined parts of the electronic device 2, and which output detection information. The tamper detection section 22 detects, for example, a change of a predetermined state of a specific part constituting the electronic device 2 in accordance with a control signal inputted from the control section 25 to output the detection signal to the control section 25.

To put it concretely, for example, when the main power supply section 211 is in an on-state, the electric power is supplied to the tamper detection section 22 and the nonvolatile memory 23 from the main power supply section 211, and the tamper detection section 22 detects a change of a predetermined state of a specific part of the plurality of parts constituting the electronic device 2 in accordance with request information (which will be described later) stored in the nonvolatile memory 23. When the main power supply section 211 is in an off-state, the electric power is supplied to the tamper detection section 22 and the nonvolatile memory 23 from the standby power supply section 212, and the tamper detection section 22 detects a change of a predetermined state of a specific part of the plurality of parts constituting the electronic device 2 in accordance with request information (which will be described later) stored in the nonvolatile memory 23.

To put it more concretely, the tamper detection section 22 detects, for example, opening of a housing of the electronic device 2, addition or replacement of hardware (such as a circuit) constituting the electronic device 2, and manipulation of software constituting the electronic device 2.

The nonvolatile memory 23 is, for example, an electronically erasable and programmable read only memory (EEPROM). For example, when the main power supply section 211 is in an on-state, the electric power is supplied to the nonvolatile memory 23 from the main power supply section 211. When the main power supply section 211 is in an off-state, the electric power is supplied to the nonvolatile memory 23 from the standby power supply section 212.

To put it concretely, the nonvolatile memory 23, as a detection information storage section for example, stores the detection information outputted from the tamper detection section 22 in accordance with a control signal inputted from the control section 25.

To put it more concretely, for example, when the main power supply section 211 is an on-state, the nonvolatile memory 23, to which the electric power is supplied by the main power supply section 211, stores the detection information outputted from the tamper detection section 22. When the main power supply section 211 is in an off-state, the nonvolatile memory 23, to which the electric power is supplied by the standby power supply section 212, stores the detection information outputted from the tamper detection section 22.

Moreover, the nonvolatile memory 23, as a request information storage section for example, stores request information for requesting the tamper detection section 22 to detect a change of a predetermined state of a specific part of the plurality of pre-defined parts in order to detect a tamper action against the electronic device 2.

To put it more concretely, the request information stored in the nonvolatile memory 23 includes pre-defined request information and/or request information received by the communication control section 24.

The request information preset in the nonvolatile memory 23 (that is, for example, the request information having been stored in the nonvolatile memory 23 before shipping the electronic device 2 from a factory) is, for example, request information for requesting the tamper detection section 22 to detect opening of a housing of the electronic device 2.

The request information which is received by the communication control section 24 and is stored in the nonvolatile memory 23 is, for example, one or a plurality of pieces of request information such as request information for requesting the tamper detection section 22 to detect addition or replacement of hardware (such as a circuit) constituting the electronic device 2, and to detect manipulation of software constituting the electronic device 2.

The detection information and the request information are stored in, for example, different regions from each other in the nonvolatile memory 23.

For example, the detection information and the request information are stored in the nonvolatile memory 23 together with a counted value counted by a not-shown counter, or time and date when the detection information or the request information is stored, which is timed by a not-shown timer section. Association between the detection information and the request information, newness of the detection information and the request information, and the like, are managed based on the counted value or the time and date.

The communication control section 24 transmits and receives various kinds of data to and from an external device (such as the server 4) through the communication network N, for example.

To put it concretely, the communication control section 24, as a detection information transmission section for example, transmits the detection information stored in the nonvolatile memory 23 to the server 4 at predetermined timing in accordance with a control signal inputted from the control section 25.

Here, the predetermined timing means, for example, the timing when the main power supply section 211 is turned into an on-state.

Moreover, the communication control section 24, as a request information receiving section for example, receives request information transmitted by the server 4. The communication control section 24 also receives a product assurance invalidating processing execution request (which will be described later) transmitted by the server 4.

As shown in FIG. 2, for example, the control section 25 includes a central processing unit (CPU) 251, a random access memory (RAM) 252, a storage section 253, and the like.

The CPU 251 performs various control operations in accordance with, for example, various processing programs for the electronic device 2, which are stored in the storage section 253.

To put it more concretely, the control section 25 controls the tamper detection section 22 and the nonvolatile memory 23 (the detection information storage section and the request information storage section) so that the tamper detection section 22 detects the change of the predetermined state of the specific part in accordance with the request information stored in the nonvolatile memory 23, and the nonvolatile memory 23 stores the detection information outputted by the tamper detection section 22.

The RAM 252 includes, for example, a program storage region for expanding a processing program and the like which are executed by the CPU 251, and a data storage region for storing input data, processing results generated when the processing program is executed, and the like.

The storage section 253 stores, for example, a system program which is executable in the electronic device 2, various processing programs which are executable on the system program, data to be used when the various processing programs are executed, data of processing result obtained from processing by the CPU 251, and the like. The programs are stored in the form of computer-readable program codes in the storage section 253.

To put it concretely, as shown in FIG. 2, for example, the storage section 253 stores a tamper detection control program 253a, a detection information transmission control program 253b, a product assurance invalidating processing program 253c, and the like.

The tamper detection control program 253a includes, for example, a function that allows the CPU 251 to input a control signal into the tamper detection section 22, to make the tamper detection section 22 detect a change of a predetermined state of a specific part of the plurality of parts constituting the electronic device 2, and to make the tamper detection section 22 output the detection information in accordance with the request information stored in the nonvolatile memory 23.

The tamper detection control program 253a, for example, also includes a function that allows the CPU 251 to input a control signal into the nonvolatile memory 23, to make the nonvolatile memory 23 store the detection information outputted from the tamper detection section 22 and the request information which is transmitted from the server 4 and received by the communication control section 24.

The detection information transmission control program 253b includes, for example, a function that allows the CPU 251 to input a control signal into the communication control section 24, to make the communication control section 24 transmit the detection information stored in the nonvolatile memory 23 to the server 4 when the main power supply section 21 is turned into an on-state.

The product assurance invalidating processing program 253c includes, for example, a function that allows the CPU 251 to execute the product assurance invalidating processing such as invalidating some important functions of the electronic device 2 in accordance with the product assurance invalidating processing execution request which is transmitted from the server 4 and received by the communication control section 24.

The product assurance invalidating processing such as invalidating some important functions of the electronic device 2 is, for example, the processing of invalidating hardware, software, or the like, which constitutes the electronic device 2.

To put it concretely, for example, when addition or replacement of hardware (such as a circuit) is detected, the CPU 251 executes processing of invalidating a function related to the circuit in accordance with the product assurance invalidating processing. For example, when manipulation of software is detected, the CPU 251 executes processing of invalidating a function related to the software in accordance with the product assurance invalidating processing.

(Server)

The server 4 is, for example, an apparatus for managing one or a plurality of electronic devices 2 connected to the communication network N. As shown in FIG. 3, for example, the server 4 includes a memory 41, a communication control section 42, a control section 43, and the like. Each section is connected to one another through a bus 40.

The memory 41 is, for example, an EEPROM or the like, and stores, for example, the detection information which is transmitted from the electronic device 2 and is received by the communication control section 42.

The detection information is stored in the memory 41 and is managed together with, for example, identification information for identifying the electronic device 2 from which the detection information is transmitted, and time and date when the detection information is received, which is timed by a not-shown timer section.

The communication control section 42, for example, transmits and receives various kinds of data to and from an external device (for example, the electronic device 2) through the communication network N.

To put it concretely, the communication control section 42, as a detection information receiving section for example, receives the detection information transmitted from the electronic device 2.

Moreover, the communication control section 42, as a request information transmission section for example, transmits request information to the electronic device 2 in accordance with a control signal inputted from the control section 43. The communication control section 42 also transmits, for example, a product assurance invalidating processing execution request to the electronic device 2.

Figure 3:
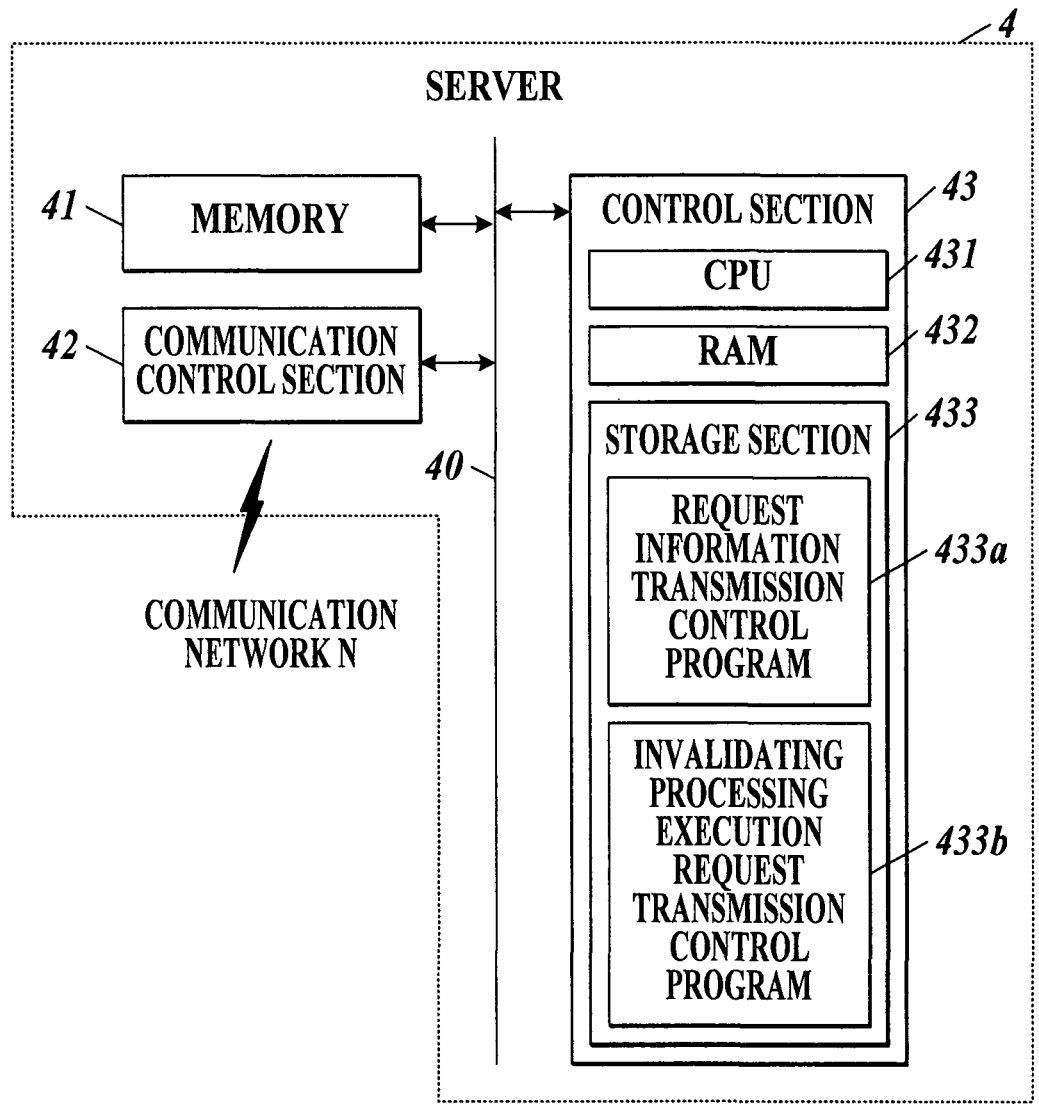
FIG. 3 is a block diagram showing a functional configuration of a server provided in the tamper detection system according to the preferred embodiment.

As shown in FIG. 3, for example, the control section 43 includes a CPU 431, a RAM 432, a storage section 433, and the like.

The CPU 431 performs various control operations in accordance with, for example, various processing programs for the server 4, which are stored in the storage section 433.

The RAM 432 includes, for example, a program storage region for expanding a processing program and the like which are executed by the CPU 431, and a data storage region for storing input data, processing results generated when the processing program is executed, and the like.

The storage section 433 stores, for example, a system program which is executable in the server 4, various processing programs which are executable on the system program, data to be used when the various processing programs are executed, data of processing result obtained from processing by the CPU 431, and the like. The programs are stored in the form of computer-readable program codes in the storage section 433.

To put it concretely, as shown in FIG. 3, for example, the storage section 433 stores a request information transmission control program 433a, an invalidating processing execution request transmission control program 433b, and the like The request information transmission control program 433a includes, for example, a function that allows the CPU 431 to input a control signal into the communication control section 42, and to make the communication control section 42 transmit one or a plurality of pieces of request information to the electronic device 2. The request information includes, for example, request information for requesting to detect addition or replacement of hardware (such as a circuit) constituting the electronic device 2, and request information for requesting to detect manipulation of software constituting the electronic device 2.

The invalidating processing execution request transmission control program 433b includes, for example, a function that allows the CPU 431 to input a control signal into the communication control section 42, and to make the communication control section 42 transmit a product assurance invalidating processing execution request for requesting to execute the product assurance invalidating processing such as invalidating some important functions of the electronic device 2, to the electronic device 2.

To put it concretely, for example, when the CPU 431 receives the detection information showing that addition or replacement of hardware (such as a circuit) is detected, the CPU 431 makes the communication control section 42 transmit the product assurance invalidating processing execution request for requesting the electronic device 2 to execute processing of invalidating a function related to the circuit. When the CPU 431 receives the detection information showing that manipulation of software is detected, the CPU 431 makes the communication control section 42 transmit the product assurance invalidating processing execution request for requesting the electronic device 2 to execute processing of invalidating a function related to the software.

<Processing>

Figure 4:
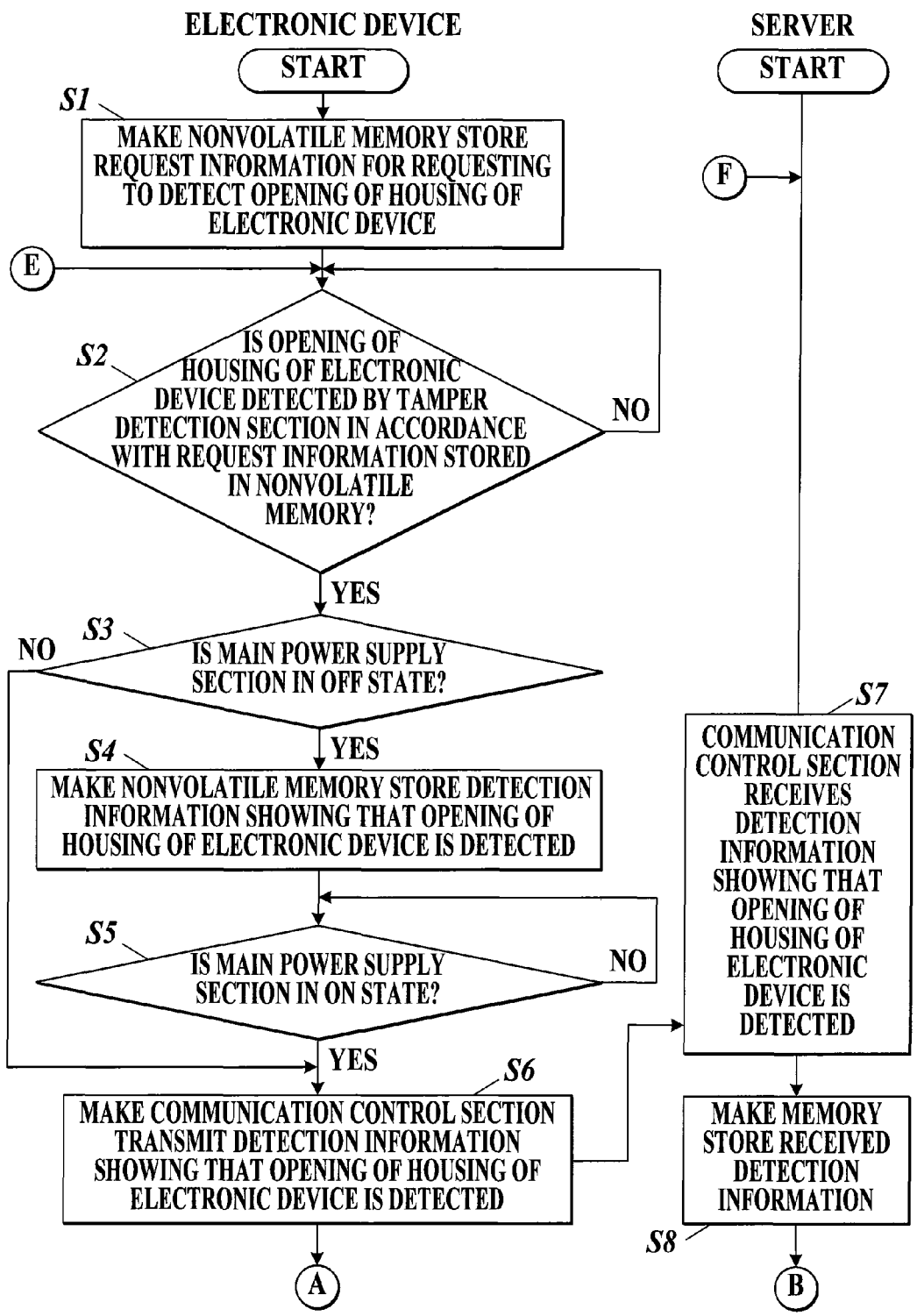
FIG. 4 is a flow chart for illustrating a first processing pertaining to detection of a tamper action by the tamper detection system according to the preferred embodiment.
Figure 5:
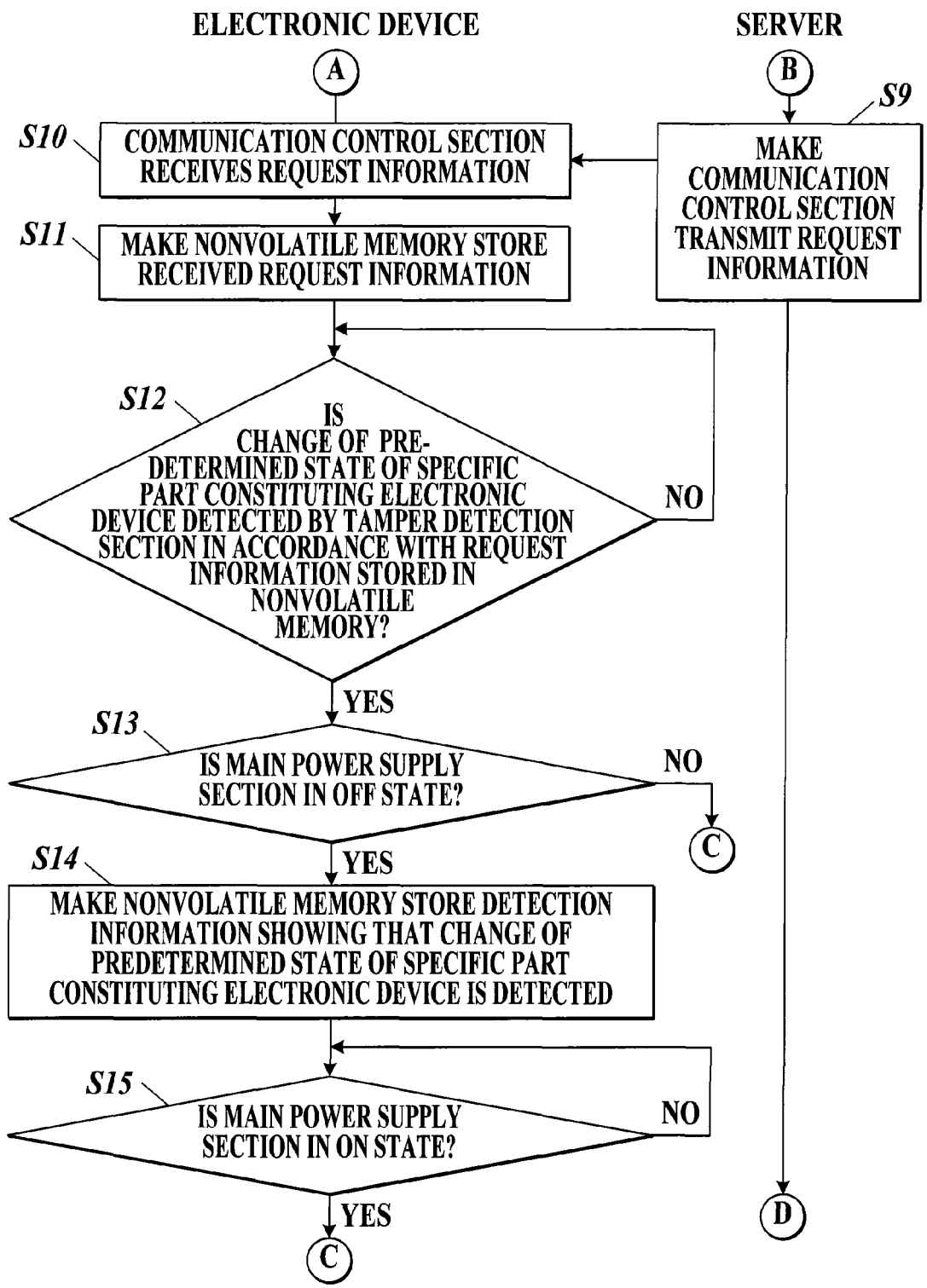
FIG. 5 is a flow chart for illustrating a second processing pertaining to the detection of the tamper action by the tamper detection system according to the preferred embodiment.
Figure 6:
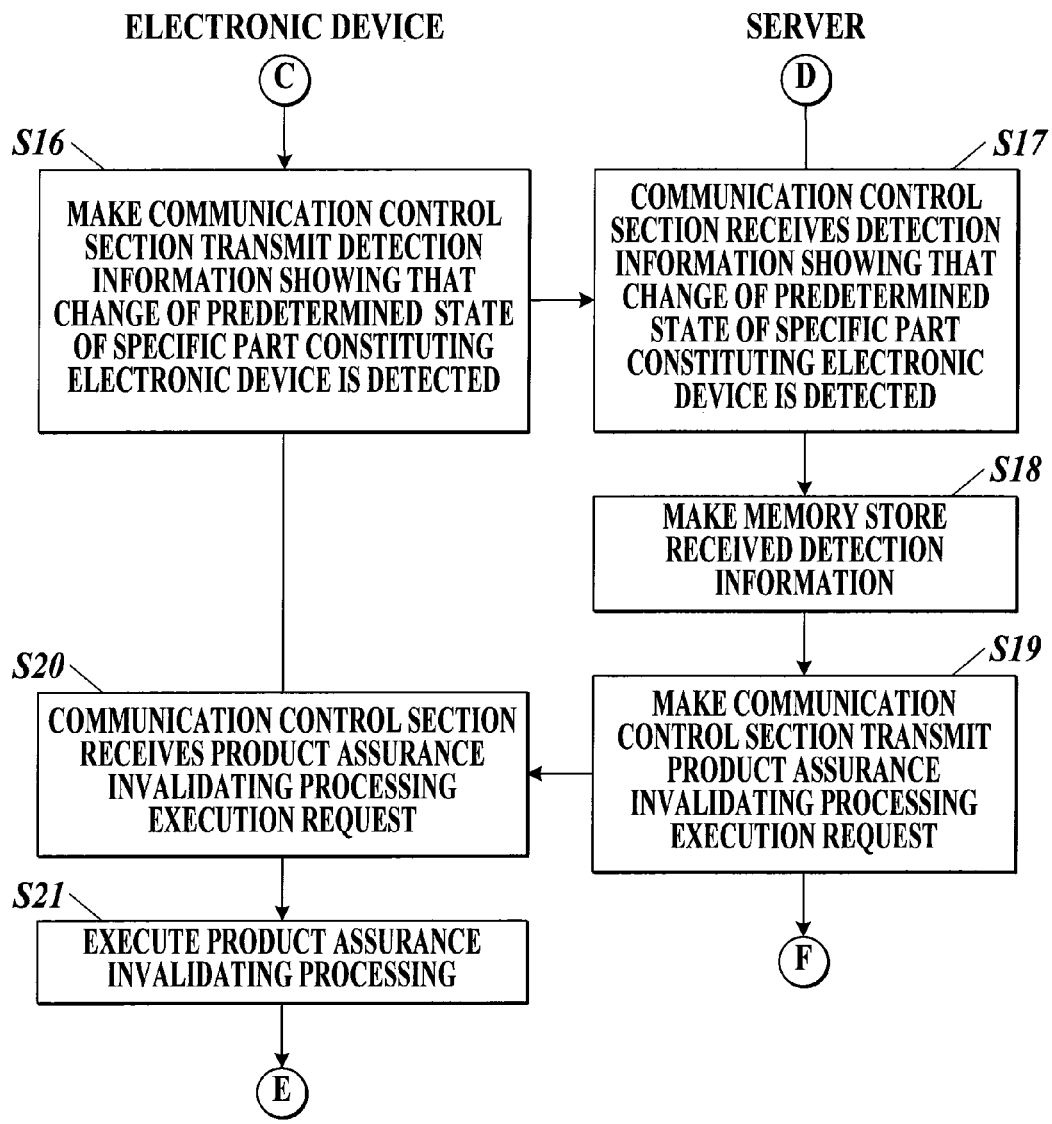
FIG. 6 is a flow chart for illustrating a third processing pertaining to the detection of the tamper action by the tamper detection system according to the preferred embodiment.

Next, processing pertaining to detection of a tamper action by the tamper detection system 1 will be described with reference to FIGS. 4-6.

First of all, when the CPU 251 of the electronic device 2 receives an instruction to set request information for requesting to detect opening of a housing of the electronic device 2 by, for example, an operation of an operation section (not shown) by an operator, the CPU 251 executes the tamper detection control program 253a to make the nonvolatile memory 23 of the electronic device 2 store the request information for requesting to detect opening of a housing of the electronic device 2 (step S1).

The processing of step S1 is executed, for example, before the shipping of the electronic device 2 from a factory.

Next, the CPU 251 judges whether the opening of the housing of the electronic device 2 is detected by the tamper detection section 22 or not in accordance with the request information, which is stored in the nonvolatile memory 23, for requesting to detect the opening of the housing of the electronic device 2 (step S2).

Processing in and after step S2 is executed, for example, after the shipping of the electronic device 2 from the factory.

When the CPU 251 judges that the opening of the housing of the electronic device 2 is not detected by the tamper detection section 22 in step S2 (step S2; No), the CPU 251 repeats the processing of step S2.

On the other hand, when the CPU 251 judges that the opening of the housing of the electronic device 2 is detected by the tamper detection section 22 in step S2 (step S2; Yes), the CPU 251 judges whether the main power supply section 211 is in an off-state or not (step S3).

When the CPU 251 judges that the main power supply section 211 is not in an off-state in step S3 (step S3; No), the CPU 251 moves to step S6.

On the other hand, when the CPU 251 judges that the main power supply section 211 is in an off-state in step S3 (step S3; Yes), the CPU 251 makes the nonvolatile memory 23 store detection information showing that the opening of the housing of the electronic device 2 is detected (step S4).

Next, the CPU 251 judges whether the main power supply section 211 is turned into an on-state or not (step S5).

When the CPU 251 judges that the main power supply section 211 is not turned into an on-state in step S5 (step S5; No), the CPU 251 repeats the processing of step S5.

When the CPU 251 judges that the main power supply section 211 is turned into an on-state in step S5 (step S5; Yes), the CPU 251 executes the detection information transmission control program 253b to make the communication control section 24 transmit the detection information showing that the opening of the housing of the electronic device 2 is detected to the server 4 (step S6).

When the communication control section 42 of the server 4 receives the detection information transmitted in step S6 (step S7), the CPU 431 of the server 4 makes the memory 41 store the received detection information (step S8).

Next, the CPU 431 executes the request information transmission control program 433a to make the communication control section 42 transmit request information for requesting to detect addition or replacement of hardware (such as a circuit) constituting the electronic device 2, and request information for requesting to detect manipulation of software constituting the electronic device 2, and the like, to the electronic device 2 (step S9).

When the communication control section 24 of the electronic device 2 receives the request information transmitted in step S9 (step S10), the CPU 251 of the electronic device 2 makes the nonvolatile memory 23 store the received request information (step S11).

Next, the CPU 251 executes the tamper detection control program 253a to judge whether a change of a predetermined state of a specific part constituting the electronic device 2, such as opening of a housing of the electronic device 2, addition or replacement of hardware (such as a circuit) constituting the electronic device 2, manipulation of software constituting the electronic device 2, is detected or not, in accordance with the request information stored in the nonvolatile memory 23 (step S12).

When the CPU 251 judges that the change of the predetermined state of the specific part constituting the electronic device 2 is not detected by the tamper detection section 22 in step S12 (step S12; No), the CPU 251 repeats the processing of step S12.

On the other hand, when the CPU 251 judges that the change of the predetermined state of the specific part constituting the electronic device 2 is detected by the tamper detection section 22 in step S12 (step S12; Yes), the CPU 251 judges whether the main power supply section 211 is in an off-state or not (step S13).

When the CPU 251 judges that the main power supply section 211 is not in an off-state in step S13 (step S13; No), the CPU 251 moves to step S16.

On the other hand, when the CPU 251 judges that the main power supply section 211 is in an off-state in step S13 (step S13; Yes), the CPU 251 makes the nonvolatile memory 23 store the detected detection information (step S14).

Next, the CPU 251 judges whether the main power supply section 211 is turned into an on-state or not (step S15).

When the CPU 251 judges that the main power supply section 211 is not turned into an on-state in step S15 (step S15; No), the CPU 251 repeats the processing of step S15.

On the other hand, when the CPU 251 judges that the main power supply section 211 is turned into an on-state in step S15 (step S15; Yes), the CPU 251 executes the detection information transmission control program 253b to make the communication control section 24 transmit the detection information showing that the change of the predetermined state of the specific part constituting the electronic device 2 is detected, to the server 4 (step S16).

When the communication control section 42 of the server 4 receives the detection information transmitted in step S16 (step S17), the CPU 431 of the server 4 makes the memory 41 store the received detection information (step S18).

Next, the CPU 431 executes the invalidating processing execution request transmission control program 433b to make the communication control section 42 transmit a product assurance invalidating processing execution request for requesting to execute product assurance invalidating processing such as invalidating some important functions of the electronic device 2, to the electronic device 2 (step S19).

When the communication control section 24 of the electronic device 2 receives the product assurance invalidating processing execution request transmitted in step S19 (step S20), the CPU 251 of the electronic device 2 executes the product assurance invalidating processing program 253c to execute the product assurance invalidating processing such as invalidating some important functions of the electronic device 2 in accordance with the received product assurance invalidating processing execution request (step S21), and repeats the processing in and after step S2.

According to the tamper detection system 1 and the electronic device 2 of the preferred embodiment described above, in order to detect a tamper action against the electronic device 2, the tamper detection section 22 can detect the changes of predetermined states of the plurality of pre-defined parts of the electronic device 2, and can output the detection information. That is, for example, not only a tamper action against software constituting the electronic device 2, but also a tamper action against hardware constituting the electronic device 2 such as addition or replacement of a circuit constituting the electronic device 2, can be detected. Therefore, it is possible to cope with a wide range of tamper actions as a result.

When the main power supply section 211 is in an off-state, the electric power is supplied to the tamper detection section 22 and the nonvolatile memory 23 from the standby power supply section 212, and the tamper detection section 22 can detect a change of a predetermined state of a specific part of the plurality of parts constituting the electronic device 2 in accordance with request information stored in the nonvolatile memory 23, and the nonvolatile memory 23 can store the detection information outputted from the tamper detection section 22. That is, because a tamper action executed when the power of the electronic device 2 is off can be detected, and the detection information can be stored, it is possible as the result to cope with a tamper action executed when the power is off. Therefore, detection of a tamper action executed when the power is off can be realized by a relatively simple structure composed of the nonvolatile memory 23 and the standby power supply section 212 besides the tamper detection section 22.

The detection information stored in the nonvolatile memory 23 can be transmitted to the server 4 at predetermined timing by the communication control section 24. That is, because information on a tamper action executed when the power of the electronic device 2 is off can be collected by transmitting the detection information to the server 4, it is possible to take measures against product-specific vulnerability of a product to be shipped or update of the product, and deterrent effect on a tamper action can be expected by getting evidence about the tamper action executed when the power of the electronic device 2 is off.

When the main power supply section 211 is turned into an on-state, the communication control section 24 can transmit the detection information stored in the nonvolatile memory 23 to the server 4. That is, because the detection information is not transmitted to the server 4 when the power of the electronic device 2 is off, it is possible to reduce consumption of electric power stored in the standby power supply section 212. Even if a power off-state of the electronic device 2 has lasted for a long period, a tamper action executed during the period can be detected. Moreover, the detection information based on a tamper action executed when the power is off can be transmitted to the server 4 at the earliest timing if the detection information is not transmitted to the server 4 when the power is off.

The request information transmitted from the server 4 can be received by the communication control section 24. Consequently, since the request information can be suitably changed by the server 4, a desired tamper action can be detected.

The present invention is not limited to the embodiment described above, and can be suitably changed without departing from the sprit of the invention.

The device of the present invention is not limited to the electronic device 2. It can be applied to any device as long as the device is connected to the server 4 through the communication network N.

The request information is not limited to the request information for requesting to detect opening of a housing of the electronic device 2, the request information for requesting to detect addition or replacement of hardware (such as a circuit) constituting the electronic device 2, and the request information for requesting to detect manipulation of software constituting the electronic device 2. It can be applied to any request information as long as the request information is for requesting to detect a change of a predetermined state of a specific part constituting the electronic device 2. For instance, it may be applied to request information for requesting to detect removal of hardware constituting the electronic device 2, and request information for requesting to detect the fact that temperature of a specific part constituting the electronic device 2 exceeds a fixed threshold value. Needless to say, phenomena detected by the tamper detection section 22 changes according to contents of the request information.

The request information preset in the nonvolatile memory 23 may include a plurality of pieces of information.

In this case, the server 4 may change contents of the request information to be transmitted according to the detection information detected in accordance with the request information preset in the nonvolatile memory 23.

For example, suppose that request information preset in the nonvolatile memory 23 is for requesting to detect opening of a housing of the electronic device 2, and for requesting to detect removal of hardware constituting the electronic device 2. If the server 4 receives the detection information detected in accordance with the request information for requesting to detect the opening of the housing of the electronic device 2, the server 4 may transmit the request information for requesting to detect manipulation of software constituting the electronic device 2, to the electronic device 2. If the server 4 receives the detection information detected in accordance with the request information for requesting to detect the removal of the hardware constituting the electronic device 2, the server 4 may transmit the request information for requesting to detect addition or replacement of hardware (such as a circuit) constituting the electronic device 2, to the electronic device 2.

Timing to transmit the detection information to the server 4 is not limited to a moment when the main power supply section 211 is turned into an on-state. It may be arbitrary timing.

According to a first aspect of the preferred embodiments of the present invention, there is provided a tamper detection system, comprising a server, and a device connected to the server through a communication network, wherein the device comprises:

a tamper detection section to detect changes of predetermined states of a plurality of pre-defined parts of the device in order to detect a tamper action against the device, and to output detection information;

a nonvolatile detection information storage section to store the detection information outputted by the tamper detection section;

a nonvolatile request information storage section to store request information for requesting the tamper detection section to detect a change of a predetermined state of a specific part of the plurality of parts;

a power supply unit including a main power supply section to supply electric power to the device, and a standby power supply section to supply electric power to the tamper detection section, the detection information storage section, and the request information storage section when the main power supply section is in an off-state;

a detection information transmission section to transmit the detection information stored in the detection information storage section to the server when the main power supply section is turned into an on-state;

a request information receiving section to receive the request information transmitted by the server; and a control section, and the server comprises:

a detection information receiving section to receive the detection information transmitted by the device; and a request information transmission section to transmit the request information to the device, and when the main power supply section is in an off-state, the electric power is supplied to the tamper detection section, the detection information storage section, the request information storage section, and the control section from the standby power supply section, and the control section controls the tamper detection section, the detection information storage section, and the request information storage section so that the tamper detection section detects the change of the predetermined state of the specific part in accordance with the request information stored in the request information storage section, and the detection information storage section stores the detection information outputted by the tamper detection section.

According to the tamper detection system, in order to detect a tamper action against the device, the tamper detection section can detect the changes of predetermined states of the plurality of pre-defined parts of the device, and can output the detection information. That is, for example, not only a tamper action against software constituting the device, but also a tamper action against hardware constituting the device such as addition or replacement of a circuit constituting the device, can be detected. Therefore, it is possible to cope with a wide range of tamper actions as a result.

When the main power supply section is in an off-state, the electric power is supplied to the tamper detection section, the request information storage section and the detection information storage section from the standby power supply section, and the tamper detection section can detect a change of a predetermined state of a specific part of the plurality of parts constituting the device in accordance with request information stored in the request information storage section, and the detection information storage section can store the detection information outputted from the tamper detection section. That is, because a tamper action executed when the power of the device is off can be detected, and the detection information can be stored, it is possible as the result to cope with a tamper action executed when the power is off. Therefore, detection of a tamper action executed when the power is off can be realized by a relatively simple structure composed of the detection information storage section, the request information storage section, and the standby power supply section besides the tamper detection section.

The detection information stored in the detection information storage section can be transmitted to the server by the detection information transmission section. That is, because information on a tamper action executed when the power of the device is off can be collected by transmitting the detection information to the server, it is possible to take measures against product-specific vulnerability of a product to be shipped or update of the product, and deterrent effect on a tamper action can be expected by getting evidence about the tamper action executed when the power of the device is off.

When the main power supply section is turned into an on-state, the detection information transmission section can transmit the detection information stored in the detection information storage section to the server. That is, because the detection information is not transmitted to the server when the power of the device is off, it is possible to reduce consumption of electric power stored in the standby power supply section. Even if a power off-state of the device has lasted for a long period, a tamper action executed during the period can be detected. Moreover, the detection information based on a tamper action executed when the power is off can be transmitted to the server at the earliest timing if the detection information is not transmitted to the server when the power is off.

The request information transmitted from the server can be received by the request information receiving section. Consequently, since the request information can be suitably changed by the server, a desired tamper action can be detected.

According to a second aspect of the preferred embodiments of the present invention, there is provided a device connected to a server through a communication network, the device comprising:

a tamper detection section to detect changes of predetermined states of a plurality of pre-defined parts of the device in order to detect a tamper action against the device, and to output detection information;

a nonvolatile detection information storage section to store the detection information outputted by the tamper detection section;

a nonvolatile request information storage section to store request information for requesting the tamper detection section to detect a change of a predetermined state of a specific part of the plurality of parts;

a power supply unit including a main power supply section to supply electric power to the device, and a standby power supply section to supply electric power to the tamper detection section, the detection information storage section, and the request information storage section when the main power supply section is in an off-state;

a detection information transmission section to transmit the detection information stored in the detection information storage section to the server at predetermined timing; and a control section, wherein when the main power supply section is in an off-state, the electric power is supplied to the tamper detection section, the detection information storage section, the request information storage section, and the control section from the standby power supply section, and the control section controls the tamper detection section, the detection information storage section, and the request information storage section so that the tamper detection section detects the change of the predetermined state of the specific part in accordance with the request information stored in the request information storage section, and the detection information storage section stores the detection information outputted by the tamper detection section.

In this device, in order to detect a tamper action against the device, the tamper detection section can detect the changes of predetermined states of the plurality of pre-defined parts of the device, and can output the detection information. That is, for example, not only a tamper action against software constituting the device, but also a tamper action against hardware constituting the device such as addition or replacement of a circuit constituting the device, can be detected. Therefore, it is possible to cope with a wide range of tamper actions as a result.

When the main power supply section is in an off-state, the electric power is supplied to the tamper detection section, the request information storage section and the detection information storage section from the standby power supply section, and the tamper detection section can detect a change of a predetermined state of a specific part of the plurality of parts constituting the device in accordance with request information stored in the request information storage section, and the detection information storage section can store the detection information outputted from the tamper detection section. That is, because a tamper action executed when the power of the device is off can be detected, and the detection information can be stored, it is possible as the result to cope with a tamper action executed when the power is off. Therefore, detection of a tamper action executed when the power is off can be realized by a relatively simple structure composed of the detection information storage section, the request information storage section, and the standby power supply section besides the tamper detection section.

The detection information stored in the detection information storage section can be transmitted to the server at predetermined timing by the detection information transmission section. That is, because information on a tamper action executed when the power of the device is off can be collected by transmitting the detection information to the server, it is possible to take measures against product-specific vulnerability of a product to be shipped or update of the product, and deterrent effect on a tamper action can be expected by getting evidence about the tamper action executed when the power of the device is off.

Preferably, the detection information transmission section transmits the detection information stored in the detection information storage section to the server when the main power supply section is turned into an on-state.

In this device, when the main power supply section is turned into an on-state, the detection information transmission section can transmit the detection information stored in the detection information storage section to the server. That is, because the detection information is not transmitted to the server when the power of the device is off, it is possible to reduce consumption of electric power stored in the standby power supply section. Even if a power off-state of the device has lasted for a long period, a tamper action executed during the period can be detected. Moreover, the detection information based on a tamper action executed when the power is off can be transmitted to the server at the earliest timing if the detection information is not transmitted to the server when the power is off.

Preferably, the device further comprises a request information receiving section to receive the request information transmitted by the server.

In this device, the request information transmitted from the server can be received by the request information receiving section. Consequently, since the request information can be suitably changed by the server, a desired tamper action can be detected.

The entire disclosure of Japanese Patent Application No. 2006-307617 filed on Nov. 14, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A tamper detection system, comprising a server, and a device connected to the server through a communication network, wherein
the device comprises:
a tamper detection section to detect changes of predetermined states of a plurality of pre-defined parts of the device in order to detect a tamper action against the device, and to output detection information;
a nonvolatile detection information storage section to store the detection information outputted by the tamper detection section;
a nonvolatile request information storage section to store request information for requesting the tamper detection section to detect a change of a predetermined state of a specific part of the plurality of parts;
a power supply unit including a main power supply section to supply electric power to the device, and a standby power supply section to supply electric power to the tamper detection section, the detection information storage section, and the request information storage section when the main power supply section is in an off-state;
a detection information transmission section to transmit the detection information stored in the detection information storage section to the server;

a request information receiving section to receive the request information transmitted by the server;
a product assurance invalidating processing execution request receiving section to receive a product assurance invalidating processing execution request transmitted by the server; and
a control section, and
the server comprises:
a detection information receiving section to receive the detection information transmitted by the device;
a request information transmission section to transmit the request information to the device; and
a product assurance invalidating processing execution request transmission section to transmit the product assurance invalidating processing execution request to the device,
the control section controls the tamper detection section and the request information storage section to be supplied with the electric power by the standby power supply section when the main power supply section is in an off-state so that the tamper detection section detects the change of the predetermined state of the specific part in accordance with the request information stored in the request information storage section,
the control section controls the detection information storage section to be supplied with the electric power by the standby power supply section when the main power supply section is in an off-state so that the detection information storage section stores the detection information outputted by the tamper detection section,
the control section controls the detection information transmission section not to transmit the detection information stored in the detection information storage section to the server when the main power supply section is in an off-state, and to transmit the detection information to the server when the main power supply section is turned into an on-state, and
the control section invalidates a part of a function of the device in accordance with the product assurance invalidating processing execution request when the product assurance invalidating processing execution request receiving section receives the product assurance invalidating processing execution request transmitted by the server.

2. A device connected to a server through a communication network, the device comprising:
a tamper detection section to detect changes of predetermined states of a plurality of pre-defined parts of the device in order to detect a tamper action against the device, and to output detection information;
a nonvolatile detection information storage section to store the detection information outputted by the tamper detection section;
a nonvolatile request information storage section to store request information for requesting the tamper detection section to detect a change of a predetermined state of a specific part of the plurality of parts;
a power supply unit including a main power supply section to supply electric power to the device, and a standby power supply section to supply electric power to the tamper detection section, the detection information storage section, and the request information storage section when the main power supply section is in an off-state;
a detection information transmission section to transmit the detection information stored in the detection information storage section to the server;

a product assurance invalidating processing execution request receiving section to receive a product assurance invalidating processing execution request transmitted by the server; and a control section, wherein the control section controls the tamper detection section and the request information storage section to be supplied with the electric power by the standby power supply section when the main power supply section is in an off-state so that the tamper detection section detects the change of the predetermined state of the specific part in accordance with the request information stored in the request information storage section, the control section controls the detection information storage section to be supplied with the electric power by the standby power supply section when the main power supply section is in an off-state so that the detection information storage section stores the detection information outputted by the tamper detection section, the control section controls the detection information transmission section not to transmit the detection information stored in the detection information storage section to the server when the main power supply section is in an off-state, and to transmit the detection information to the server when the main power supply section is turned into an on-state, and the control section invalidates a part of a function of the device in accordance with the product assurance invalidating processing execution request when the product assurance invalidating processing execution request receiving section receives the product assurance invalidating processing execution request transmitted by the server.

3. The device according to claim 2, further comprising a request information receiving section to receive the request information transmitted by the server.

* * * * *